(12) United States Patent
Hammerschmidt

(10) Patent No.: US 11,859,971 B2
(45) Date of Patent: Jan. 2, 2024

(54) SAFETY MECHANISM FOR ANGLE SENSORS USING SEGMENTATION

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 108 days.

(21) Appl. No.: 17/304,439

(22) Filed: Jun. 21, 2021

(65) Prior Publication Data
US 2022/0404135 A1    Dec. 22, 2022

(51) Int. Cl.
G01B 7/30         (2006.01)
G01D 5/14         (2006.01)
G01D 5/16         (2006.01)

(52) U.S. Cl.
CPC .............. *G01B 7/30* (2013.01); *G01D 5/145* (2013.01); *G01D 5/16* (2013.01)

(58) Field of Classification Search
CPC ............. G01B 7/30; G01D 5/145; G01D 5/16
See application file for complete search history.

(56) References Cited

U.S. PATENT DOCUMENTS

| 8,699,371 | B2 | 4/2014 | Reidl et al. | |
|---|---|---|---|---|
| 10,386,170 | B2 * | 8/2019 | Anagawa | G01D 3/02 |
| 2018/0172423 | A1 * | 6/2018 | Ausserlechner | G01D 5/145 |
| 2018/0238711 | A1 * | 8/2018 | Zimmer | G01D 5/145 |
| 2018/0292223 | A1 * | 10/2018 | Leach | G01C 21/20 |
| 2018/0356253 | A1 * | 12/2018 | Hammerschmidt | G01D 5/145 |

\* cited by examiner

*Primary Examiner* — Eman A Alkafawi
*Assistant Examiner* — Dilara Sultana
(74) *Attorney, Agent, or Firm* — Harrity & Harrity, LLP

(57) ABSTRACT

In some implementations, an angle sensor may receive a first x-component value and a first y-component value from a first set sensing elements and a second x-component value and a second y-component value from a second set of angle sensing elements. The angle sensor may perform a safety check including determining a first range of angles associated with a target object based on a relationship between a magnitude of the first x-component value and a magnitude of the first y-component value; determining a second range of angles associated with the target object based on a relationship between a magnitude of the second x-component value and a magnitude of the second y-component value; and determining whether the second range of angles is a subset of the first range of angles. The angle sensor may output an indication of a result of the safety check.

20 Claims, 8 Drawing Sheets

SAFETY MECHANISM FOR ANGLE SENSORS USING SEGMENTATION

BACKGROUND

An angle sensor may include a set of sensing components that sense a strength of different components (e.g., an x-component and a y-component) of a magnetic field produced or distorted by a target object. The angle sensor may determine an angular position of the target object based on the strength of the components of the magnetic field and may provide an output that indicates the angular position as determined by the angle sensor.

SUMMARY

In some implementations, a method includes receiving, by a system, a first x-component value and a first y-component value from a first set sensing elements; receiving, by the system, a second x-component value and a second y-component value from a second set of angle sensing elements; performing, by the system, a safety check including: determining a first range of angles associated with a target object based on a relationship between a magnitude of the first x-component value and a magnitude of the first y-component value; determining a second range of angles associated with the target object based on a relationship between a magnitude of the second x-component value and a magnitude of the second y-component value; and determining whether the second range of angles is a subset of the first range of angles; and outputting, by the system, an indication of a result of performing the safety check based on whether the second range of angles is a subset of the first range of angles.

In some implementations, an angle sensor includes a first angle measurement path to determine a first x-component value and a first y-component value based on sensor values from a first set sensing elements; a second angle measurement path to determine a second x-component value and a second y-component value based on sensor values from a second set of angle sensing elements; a safety path to perform a safety check, the safety path being configured to: determine a first range of angles associated with a target object based on a relationship between the first x-component value and the first y-component value; determine a second range of angles associated with the target object based on a relationship between the second x-component value and the second y-component value; and determine whether the second range of angles is a subset of the first range of angles; and an output component to provide an indication of a result of performing the safety check based on whether the second range of angles is a subset of the first range of angles.

In some implementations, a sensor system comprising: a first set of angle sensing elements configured to determine a first x-component value and a first y-component value; a second set of angle sensing elements configured to determine a second x-component value and a second y-component value from a second set of angle sensing elements; a safety check component configured to: determine a first range of angles associated with a target object based on a relationship between a magnitude of the first x-component value and a magnitude of the first y-component value; determine a second range of angles associated with the target object based on a relationship between a magnitude of the second x-component value and a magnitude of the second y-component value; and determine whether the second range of angles is a subset of the first range of angles; and an output component to provide an indication of a result of a safety check based on whether the second range of angles is a subset of the first range of angles.

DETAILED DESCRIPTION

Figure 1A:
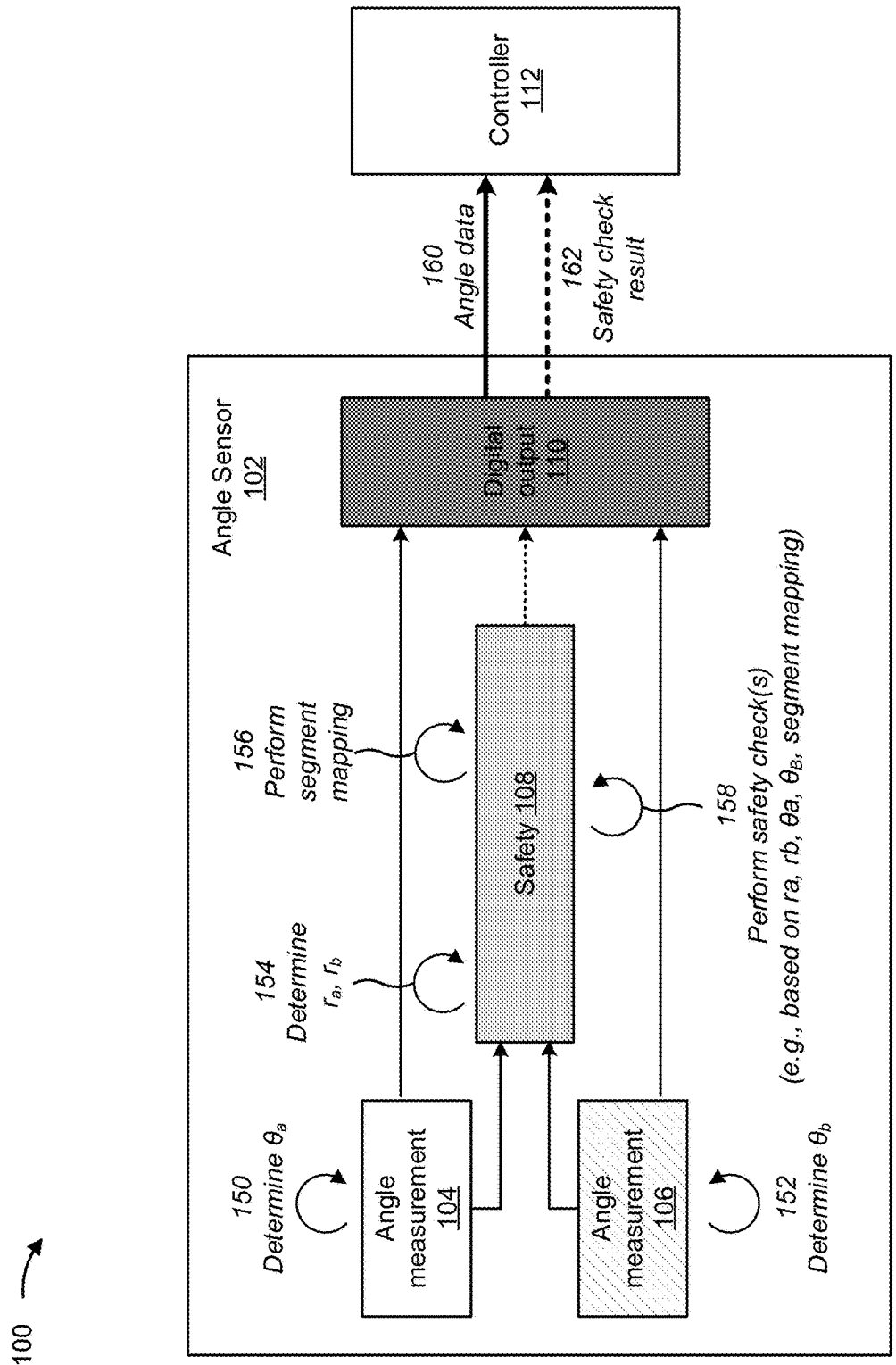
FIGS. 1A and 1B are diagrams associated with example operations of a system comprising a safety mechanism for an angle sensor using segmentation, as described herein.

The following detailed description of example implementations refers to the accompanying drawings. The same reference numbers in different drawings may identify the same or similar elements.

An angle sensor may be designed to determine an angular position of a target object (e.g., a rotatable object) in a given application. For example, an angle sensor may be used in an electronic power steering (EPS) application to determine an angular position of a steering column. In some applications, it may be necessary to ensure functional safety of the angle sensor.

In general, functional safety can be defined as an absence of unreasonable risk (e.g., to a system, to an environment, to people, and/or the like) due to hazards caused by malfunctioning behavior (e.g., a systematic failure, a random failure, or the like) of the angle sensor. In the automotive context, an Automotive Safety Integrity Level (ASIL) scheme is used to dictate functional safety requirements for an angle sensor. The ASIL scheme is a risk classification scheme defined by the International Organization for Standardization (ISO) 26262 standard (titled Functional Safety for Road Vehicles), which provides a standard for functional safety of electrical and/or electronic systems in production automobiles. An ASIL classification defines safety requirements necessary to be in line with the ISO 26262 standard. An ASIL is established by performing a risk analysis of a potential hazard by looking at severity, exposure, and controllability of a vehicle operating scenario. A safety goal for that hazard in turn guides the ASIL requirements. There are four ASILs identified by the standard: ASIL A, ASIL B, ASIL C, ASIL D. ASIL D dictates the highest integrity requirements, while ASIL A dictates the lowest. A hazard with a risk that is low (and, therefore, does not require safety measures in accordance with ISO 26262) is identified as quality management (QM). In some cases, it is desirable or required that an angle sensor achieves a high ASIL. For example, it may be desirable or required that an angle sensor used in a given application achieves ASIL B, ASIL C, or ASIL D. To ensure functional safety in an angle sensor, a safety mechanism that allows malfunctioning behavior to be identified and signaled should be implemented.

Some implementations described herein provide a safety mechanism for an angle sensor. In some implementations, the angle sensor includes a first angle measurement path to determine an angular position based on sensor values from a first set of angle sensing elements, and a second angle measurement path to determine the angular position based on sensor values from a second set of angle sensing elements. The first and second sets of angle sensing elements may be different types of sensing elements. For example, the first set of angle sensing elements may be a set of magnetoresistive (MR) sensing elements (e.g., a set of anisotropic magnetoresistance (AMR) elements, giant magnetoresistance (GMR) elements, tunnel magnetoresistance (TMR) elements, or the like) and the second set of angle sensing elements may be a set of Hall-based sensing elements (e.g., a set of angle sensing elements that operate based on the Hall effect).

In some implementations, the measurement range provided by the first set of angle sensing elements may be different from the measurement range provided by the second set of angle sensing elements. The measurement range provided by the first set of angle sensing elements may be 360 degrees (°). For example, the set of angle sensing elements 202 may include a set of GMR sensing elements, a set of TMR sensing elements, a set of Hall-based sensing elements, or the like. The measurement range provided by the set of angle sensing elements 204 may be 180°. For example, the set of angle sensing elements 204 may include a set of AMR sensing elements.

Each of the first and second sets of angle sensing elements may include one or more components configured to obtain respective sets of sensor values for determining an angular position of a target object. A set of sensor values may include a value of a signal indicating a y-component of the angular position (also referred to as a sine value) and a value of a signal indicating an x-component of the angular position (also referred to a cosine value). The angle sensor includes a safety path to perform a set of safety checks associated with the first angle measurement path and/or the second angle measurement path based on the sine values and the cosine values measured by the first and second sets of angle sensing elements. The set of safety checks may include a segment comparison check.

The safety path may segment the measurement range provided by the first set of angle sensing elements and the measurement range provided by the second set of angle sensing elements based on the intersections of the respective x-component signals and the y-component signals. For example, the safety path may segment the 360° measurement range associated with the first set of angle sensing elements into 45° segments and may segment the 180° measurement range associated with the second set of angle sensing elements into 22.5° segments. The safety path may perform a safety check based on determining whether a range of angles associated with a segment of the 180° measurement range and a range of angles associated with a segment of the 360° measurement range. The range of angles associated with the 180° measurement range may include the x-component and y-component determined by the second set of angle sensing elements. The range of angles associated with a segment of the 360° measurement range may include the x-component and y-component determined by the first set of angle sensing elements. The safety path may enable a failure (e.g., in the first angle measurement path or in the second angle measurement path) path to be detected based whether the range of angles associated with a segment of the 180° measurement range that includes the x-component and y-component determined by the second set of angle sensing elements is within a range of angles associated with a segment of the 360° measurement range that includes the x-component and y-component determined by the first set of angle sensing elements. By utilizing the segmentation of the measurement ranges, the safety path may perform the safety check without any compensation of temperature and magnetic field strength variation, since those effects can be assumed to affect the x and y channels with a sufficient matching accuracy.

Figure 1B:
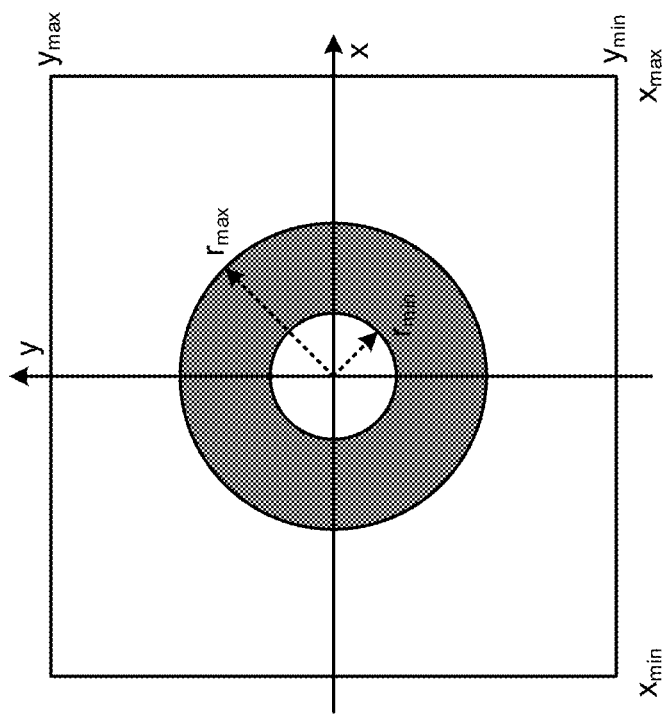

FIGS. 1A and 1B are diagrams associated with example operations of a system 100 comprising a safety mechanism for an angle sensor 102, as described herein. As shown in FIG. 1A, the system 100 includes the angle sensor 102 comprising an angle measurement path 104, an angle measurement path 106, a safety path 108, and a digital output component 110. As further shown, the system 100 includes a controller 112. The components of the system 100 are described below, followed by a description of an example operation of the system 100. In some implementations, the angle measurement path 104, the angle measurement path 106, and the safety path 108 are integrated on a monolithic semiconductor device (e.g., a single chip).

An angle measurement path (e.g., the angle measurement path 104, the angle measurement path 106) includes one or more components associated with determining an angular position θ (theta) of a target object (not shown) based on a set of sensor values. For example, the set of sensor values can include a value of a signal indicating a y-component of the angular position θ (also referred to as a sine value) and a value of a signal indicating an x-component of the angular position θ (also referred to a cosine value). Here, a given angle measurement path may determine an angular position θ of the target object based on the y-component and the x-component (e.g., by calculating an arctangent of the y-component divided by the x-component).

In some implementations, the angle measurement path 104 and the angle measurement path 106 utilize the same type of sensing elements. In some implementations, the angle measurement path 104 and the angle measurement path 106 utilize different types of sensing elements, meaning that the angle measurement path 104 and the angle measurement path 106 are diverse measurement paths. In some implementations, a measurement range on the angle measurement path 104 is different from a measurement range on the angle measurement path 106.

The safety path 108 includes one or more components associated with performing one or more safety checks associated with the angle sensor 102. In some implementations, the one or more safety checks include a segment comparison check. Additional details regarding example implementations of segment comparison check are provided below with respect to FIGS. 2A-2D. In some implementations, the one or more safety checks include a vector length check associated with the angle measurement path 104. In some implementations, the one or more safety checks include a vector length check associated with the angle measurement path 106. In some implementations, the one or more safety checks include a comparison check associated with the angular position θ as determined on the angle measurement path 104 and the angular position θ as determined on the angle measurement path 106.

In some implementations, as shown in FIG. 1A, the safety path 108 is configured to receive sensor values (e.g., a sine value and a cosine value) from the angle measurement path 104, sensor values from the angle measurement path 106, information associated with a vector length $r_a$ associated with the sensor values from the angle measurement path 104, information associated with a vector length $r_b$ associated with the sensor values from the angle measurement path 106, information associated with the angular position $\theta_a$ determined on the angle measurement path 104, information associated with the angular position $\theta_b$ determined in the angle measurement path 106, and/or one or more items of information in association with performing the one or more safety checks, as described herein. In some implementations, the safety path 108 is configured to provide a safety indication (e.g., a failure indication, an error indication, a deactivation indication, an OK indication, or the like) to the digital output component 110.

The digital output component 110 includes one or more components associated with generating and transmitting one or more outputs (e.g., an output carrying sensor data, an output carrying an indication of a result of the one or more safety checks, or the like). In some implementations, as shown in FIG. 1A, the digital output component 110 may receive one or more signals from the angle measurement path 104, the angle measurement path 106, and the safety path 108, and may generate and transmit the one or more outputs accordingly. In some implementations, the digital output component 110 transmits the one or more outputs to the controller 112.

The controller 112 includes one or more components associated with controlling one or more electrical systems and/or electrical subsystems based on information provided by the sensor 102. The controller 112 may include, for example, a microcontroller (μC) or an electronic control unit (ECU), among other examples. In some implementations, the controller 112 may be capable of calibrating, controlling, adjusting, and/or the like, the one or more electrical systems and/or electrical subsystems based on information received from the sensor 102. For example, in some implementations, the controller 112 may be configured to determine an angular position θ of the target object and/or one or more other items of information (e.g., a rotational speed of the target object, a rotational direction of the target object, or the like), determine information associated with the one or more safety checks for the sensor 102, and/or provide such information or perform one or more operations in association with controlling the one or more electrical systems and/or electrical subsystems based on such information. In some implementations, the controller 112 is connected to the sensor 102 such that the controller 112 can receive information (e.g., one or more signals) from the sensor 102 via one or more transmission interfaces and/or via one or more output terminals.

An example operation of the system 100 is illustrated in FIG. 1A. As shown by reference 150, the angle measurement path 104 determines an angular position $\theta_a$. In some implementations, the angle measurement path 104 determines the angular position $\theta_a$ based on sensor values provided by the set of angle sensing elements on the angle measurement path 104 (e.g., a set of MR sensing elements, such as a set of AMR sensing elements). In some implementations, the angle measurement path 104 provides one or more signals to the safety path 108. The one or more signals provided by the angle measurement path 104 to the safety path 108 may include, for example, one or more signals indicating the sensor values from the angle measurement path 104 (e.g., an x-component value $x_a$ and a y-component value $y_a$), a vector length $r_a$ computed from the sensor values (e.g., when the angle measurement path 104 is configured to compute the vector length $r_a$)), and/or the angular position $\theta_a$. Further, in some implementations, the angle measurement path 104 provides a signal indicating the angular position $\theta_a$ to the digital output component 110.

As shown by reference 152, the angle measurement path 106 determines an angular position $\theta_b$. In some implementations, the angle measurement path 106 determines the angular position $\theta_b$ based on sensor values provided by the set of angle sensing elements on the angle measurement path 106 (e.g., a set of Hall-based sensing elements or a set of MR sensing elements, such as a set of GMR sensing elements or TMR sensing elements). In some implementations, the angle measurement path 106 provides one or more signals to the safety path 108. The one or more signals provided by the angle measurement path 106 to the safety path 108 may include, for example, one or more signals indicating the sensor values from the angle measurement path 106 (e.g., an x-component value $x_b$ and a y-component value $y_b$), a vector length $r_b$ computed from the sensor values (e.g., when the angle measurement path 106 is configured to compute the vector length $r_b$), and/or the angular position $\theta_b$. Further, in some implementations, the angle measurement path 106 provides a signal indicating the angular position $\theta_b$ to the digital output component 110.

As shown by reference 154, the safety path 108 determines the vector length $r_a$ associated with the angle measurement path 104 and the vector length $r_b$ associated with the angle measurement path 106. In some implementations, the safety path 108 determines the vector length $r_a$ by receiving an indication of the vector length $r_a$ from the angle measurement path 104, as described above (e.g., when the angle measurement path 104 is configured to compute the vector length $r_a$). Alternatively, in some implementations, the safety path 108 determines the vector length $r_a$ by computing the vector length $r_a$ based on the sensor values received from the angle measurement path 104. Similarly, the safety path 108 determines the vector length $r_b$ by receiving an indication of the vector length $r_b$ from the angle measurement path 106, as described above (e.g., when the angle measurement path 106 is configured to compute the vector length $r_b$). Alternatively, in some implementations, the safety path 108 determines the vector length $r_b$ by computing the vector length $r_b$ based on the sensor values received from the angle measurement path 106.

In some implementations, a given vector length r (e.g., the vector length $r_a$, the vector length $r_b$) is determined using the following equation:

$$r = \mathrm{sqrt}(X^2 + Y^2)$$

where X is the x-component of the angular position θ, and Y is the y-component of the angular position θ. That is, the vector length r corresponds to a magnitude of the electrical vector, whose elements are given by the x-component (cosine) channel and the y-component (sine) channel of a given angle measurement path. Notably, the vector length r is independent of the angular position θ.

As shown by reference number 156, the safety path 108 may perform segment mapping. The safety path 108 may perform segment mapping as described below with respect to FIGS. 2A-2D.

As shown by reference number 158, the safety path 108 performs one or more safety checks. In some implementations, a safety check performed by the safety path 108 is based on the segment mapping as described below with respect to FIGS. 2A-2D.

In some implementations, a safety check performed by the safety path 108 is based on the vector length $r_a$, the angular position $\theta_a$, the vector length $r_b$, and/or the angular position $\theta_b$. In some implementations, the one or more safety checks include one or more vector length checks. For example, the one or more safety checks may include a vector length check associated with the vector length $r_a$ and/or a vector length check associated with the vector length $r_b$. In an ideal scenario, a given vector length r (e.g., the vector length $r_a$, the vector length $r_b$) remains constant during operation of the sensor 102 (e.g., due to the principle that $\cos^2 \theta + \sin^2 \theta = 1$). If, for example, a sensor channel (e.g., the x-component channel or the y-component channel) of a given angle measurement path (e.g., the angle measurement path 104 or the angle measurement path 106) experiences a stuck-at fault, the vector length r will change as function of the angle $\theta$. This change in the vector length r can be detected by the vector length check performed by the safety path 108. Therefore, when performing the vector length check, the safety path 108 determines whether the vector length r stays within an allowable vector length range (e.g., a vector length range defined by a minimum vector length $r_{min}$ and a maximum vector length $r_{max}$). FIG. 1B is a diagram illustrating a visualization of a vector length check. In the visualization shown in FIG. 1B, the vector length check is a determination of whether the vector length r is within the shaded region defined by the minimum vector length $r_{min}$ and the maximum vector length $r_{max}$.

Notably, digital signal processing performed by the sensor 102 can provide compensation for imperfections of components of the sensor 102 (e.g., the set of angle sensing elements, one or more analog-to-digital converters (ADCs), or the like). For example, a digital signal processor (DSP) of the sensor 102 may receive raw (i.e., uncompensated) sensor values as input, perform compensation, and output compensated sensor values. Parameters for this compensation can be based on calibration and/or autocalibration. For example, offsets of the raw sensor values can drift with temperature. Here, relevant parameters to compensate such drifts can be determined during end-of-line testing (i.e., calibration) and stored in a memory (e.g., a non-volatile memory (NVM)) of the sensor 102. These parameters can then be used during operation of the sensor 102 for providing compensation, which leads to reduced offsets of the compensated sensor values over temperature. Notably, a well-compensated angle measurement path shows negligible variation in amplitude of sensor values and, therefore, the vector length r associated with the given angle measurement path may be independent of temperature. Additionally, for saturated sensing elements (e.g., MR sensing elements), the vector length r does not depend significantly on a magnitude of the magnetic field. In some implementations, the minimum vector length $r_{min}$ and the maximum vector length $r_{max}$ can be determined based on taking such variations and margins into consideration. That is, the allowable vector length range can be smaller for a well-compensated sensor 102 (e.g., as compared to an angle sensor with no or poor compensation), thereby improving functional safety of the sensor 102.

In some implementations, the minimum vector length $r_{min}$ and the maximum vector length $r_{max}$ are stored in the memory of the sensor 102 (e.g., after calibration). During operation, the safety path 108 compares the computed vector length r to the stored minimum vector length $r_{min}$ and maximum vector length $r_{max}$. Here, if the vector length r is not within the allowable vector length range (i.e., if the computed vector length is less than the minimum vector length $r_{min}$ or is greater than the maximum vector length $r_{max}$), then the safety path 108 may, for example, signal an error to the digital output component 110.

In some implementations, the safety path 108 performs a vector length check associated with the angle measurement path 104. That is, the safety path 108 may determine whether the vector length $r_a$ is within an allowable vector length range. Additionally, or alternatively, in some implementations, the safety path 108 performs a vector length check associated with the angle measurement path 106. That is, the safety path 108 may determine whether the vector length $r_b$ is within an allowable vector length range (e.g., the same allowable vector length range as used for the check of the vector length $r_a$ or a different allowable vector length range than that used for the check of the vector length $r_a$).

In some implementations, the one or more safety checks include a comparison check associated with the angular position $\theta_a$ and the angular position $\theta_b$. In some implementations, the safety path 108 performs the comparison check by determining whether the angular position $\theta_a$ (e.g., the angular position determined on the angle measurement path 104) matches the angular position $\theta_b$ (e.g., the angular position determined on the angle measurement path 106). That is, the safety path 108 may perform the comparison check by determining whether a difference between the angular position $\theta_a$ and the angular position $\theta_b$ is less than a threshold value (e.g., a tolerance value). In some implementations, information indicating the threshold may be stored on the memory of the sensor 102. During operation, the safety path 108 compares the computed difference between the angular position $\theta_a$ and the angular position $\theta_b$ to the threshold. Here, if the difference does not satisfy (e.g., is greater than) the threshold, then the safety path 108 may, for example, signal an error to the digital output component 110.

In some implementations, the safety path 108 provides information indicating a result of the one or more safety checks to the digital output component 110. For example, as indicated above, the safety path 108 may provide an indication of an error associated with the x-component check, an error associated with the y-component check, an error associated with the vector length check associated with the angle measurement path 104, an error associated with the vector length check associated with the angle measurement path 106, and/or an error associated with the comparison check. As another example, the safety path 108 may provide an indication that a given safety check has passed (e.g., an indication that the angle measurement path 104 and/or the angle measurement path 106 has passed the x-component check, an indication that the angle measurement path 104 and/or the angle measurement path 106 has passed the y-component check, an indication that the angle measurement path 104 has passed the vector length check, an indication that the angle measurement path 106 has passed the vector length check, and/or an indication that the angle measurement paths 104/106 have passed the comparison check).

Returning to FIG. 1A, as shown by reference numbers 160 and 162, the digital output component 110 may provide angle data and an indication of a result of the one or more safety checks to the controller 112. In some implementations, the angle data includes an indication of the angular position $\theta_a$ and/or an indication of the angular position $\theta_b$. In some implementations, the indication of the result of the one or more safety checks may include an indication of whether a given safety check has failed or passed. Alternatively, in some implementations, the indication of the result of the safety check may include an indication that a given safety check has failed (i.e., the digital output component 110 may provide an indication for the given safety check only when the given safety check fails).

As indicated above, FIGS. 1A and 1B are provided as examples. Other examples may differ from what is described with regard to FIGS. 1A and 1B. Further, the number and arrangement of components shown in FIG. 1A are provided as an example. In practice, there may be additional components, fewer components, different components, or differently arranged components than those shown in FIG. 1A. Furthermore, two or more components shown in FIG. 1A may be implemented within a single component, or a single component shown in FIG. 1A may be implemented as multiple, distributed components. Additionally, or alternatively, a set of components (e.g., one or more components) shown in FIG. 1A may perform one or more functions described as being performed by another set of components shown in FIG. 1A.

Figure 2A:
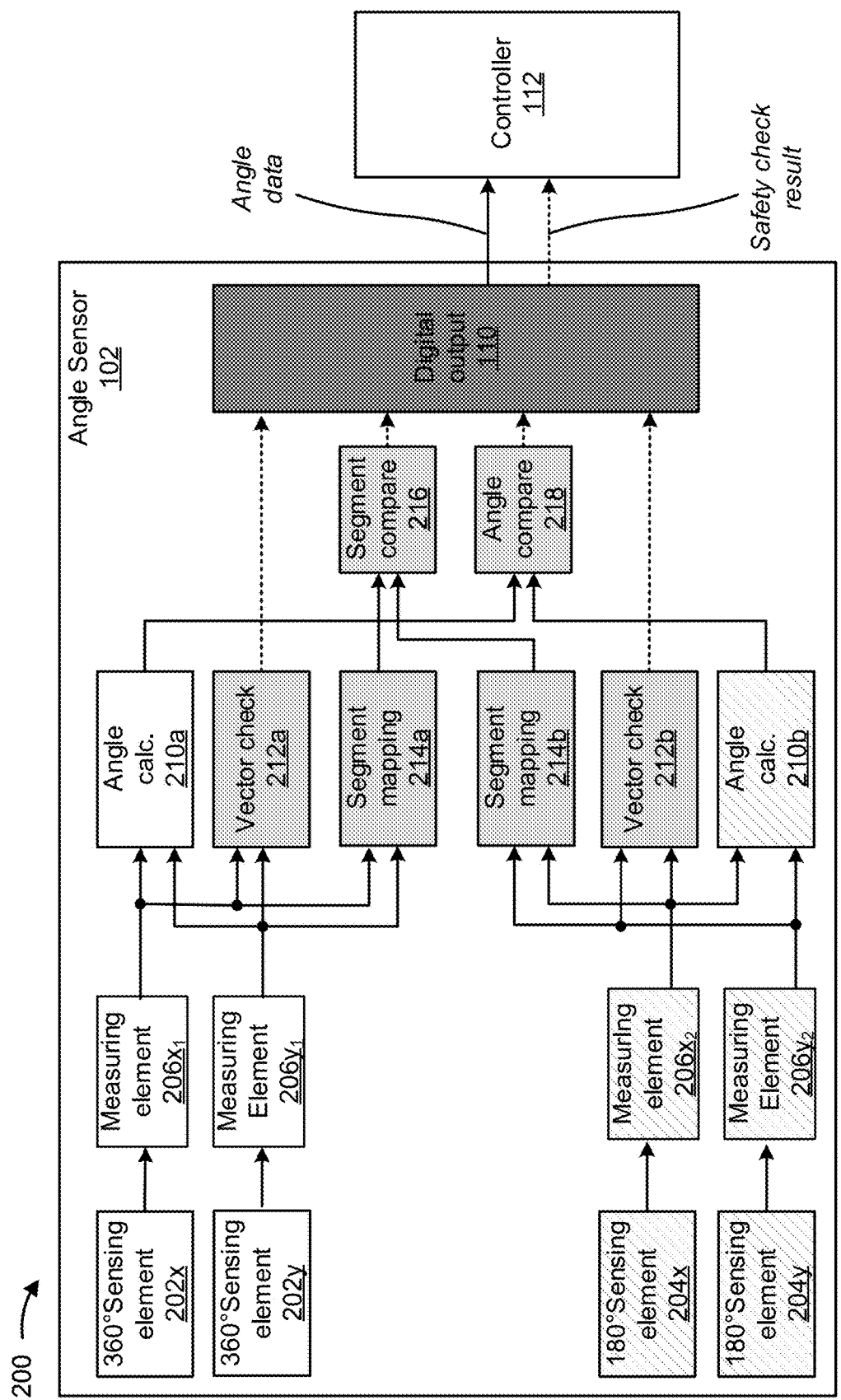
FIGS. 2A-2D are diagrams of example implementations of the system comprising the safety mechanism for an angle sensor, as described herein.
Figure 2B:
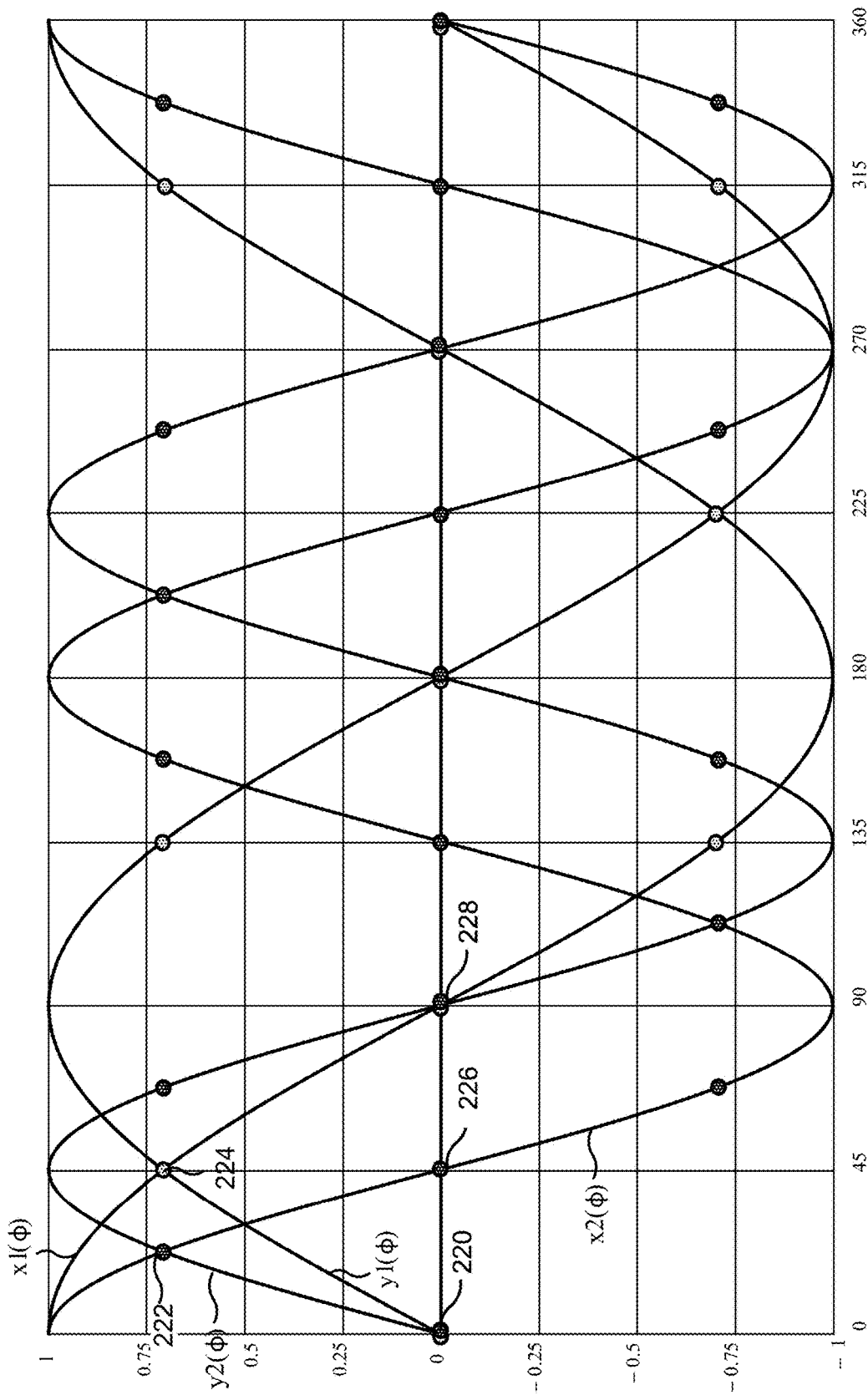

FIGS. 2A-2D are diagrams of example implementations of the system 100 comprising a safety mechanism (e.g., safety path 108) for an angle sensor (e.g., angle sensor 102) using segmentation, as described herein. In FIGS. 2A and 2B, components of the angle measurement path 104 are indicated by a white color, components of the angle measurement path 106 are indicated by a hatched pattern, components of the safety path 108 are indicated by a light gray color, and the digital output component is indicated by a dark gray color. Additionally, the safety path 108 includes one or more vector length check components 212 (e.g., a vector length check component 212a, a vector length check component 212b), a segment mapping component 214a, a segment mapping component 214b, a segment comparison component 216, and an angle comparison component 218.

Generally, as illustrated in FIGS. 2A-2D for example, the angle measurement path 104 includes a set of angle sensing elements 202 (e.g., a sensing element 202x for sensing the x-component of a magnetic field and a sensing element 202y for sensing the y-component of the magnetic field), a set of measuring elements 206 (e.g., a measuring element $206x_1$ for measuring the x-component sensed by the sensing element 202x and a measuring element $206y_1$ for measuring the y-component sensed by the sensing element 202y), and an angle calculation component 210a. Similarly, the angle measurement path 106 includes a set of angle sensing elements 204 (e.g., a sensing element 204x for sensing the x-component of a magnetic field and a sensing element 204y for sensing the y-component of the magnetic field), a set of measuring elements 206 (e.g., a measuring element $206x_2$ for measuring the x-component sensed by the sensing element 204x and a measuring element $206y_2$ for measuring the y-component sensed by the sensing element 204y), and an angle calculation component 210b.

A set of angle sensing elements (e.g., the set of angle sensing elements 202 or the set of angle sensing elements 204) is a set of components for sensing a magnetic field at the angle sensor 102. In some implementations, as described above, each set of angle sensing elements 202/204 includes a sensing element 202/204 configured to sense an x-component of the magnetic field and a sensing element 202/204 configured to sense a y-component of the magnetic field. In some implementations, a given set of angle sensing elements 202/204 may include MR sensing elements, which are elements comprised of a magnetoresistive material (e.g., nickel-iron (NiFe)), where an electrical resistance of the magnetoresistive material depends on a strength and/or a direction of the magnetic field present at the magnetoresistive material. Here, the given set of angle sensing elements 202/204 may operate based on an AMR effect, a GMR effect, or a TMR effect, among other examples. Further, in some implementations, a given set of angle sensing elements 202/204 may include a set of Hall-based sensing elements that operate based on the Hall effect. In some implementations, a given sensing element 202/204 may provide an analog signal, corresponding to a strength of a component of the magnetic field, to a measuring element 206.

A measuring element 206 may include an ADC that converts analog signals from a set of angle sensing elements 202/204 to a digital signal. For example, the measuring element $206x_1$ may include an ADC that converts analog signals, received from the set of angle sensing elements 202, into digital signals to be processed by a DSP of the measuring element $206x_1$.

In some implementations, as shown in FIG. 2A, the angle measurement path 104 and the angle measurement path 106 are diverse measurement paths. Thus, the set of angle sensing elements 202 on the angle measurement path 104 may in some implementations include a set of MR sensing elements, while the set of angle sensing elements 204 on the angle measurement path 106 may include a set of Hall-based sensing elements. As another example, the set of angle sensing elements 202 on the angle measurement path 104 may in some implementations include a first set of MR sensing elements (e.g., a set of AMR elements), while the set of angle sensing elements 204 on the angle measurement path 106 may include a second set of MR elements (e.g., a set of GMR elements or a set of TMR elements, among other examples). In some implementations, the measurement range provided by the set of angle sensing elements 202 is different from the measurement range provided by the set of angle sensing elements 204. As shown in FIG. 2A, the measurement range provided by the set of angle sensing elements 202 may be 360 degrees (°). For example, the set of angle sensing elements 202 may include a set of GMR sensing elements, a set of TMR sensing elements, a set of Hall-based sensing elements, or the like. The measurement range provided by the set of angle sensing elements 204 may be 180°. For example, the set of angle sensing elements 204 may include a set of AMR sensing elements.

The use of diverse angle measurement paths 104/106 provided by the sets of angle sensing elements 202/204 provides both redundancy of angle measurement and diversity of sensing principle, thereby enhancing functional safety of the angle sensor 102. In some implementations, the set of sensors 202/204 may integrate gain and offset calibration including temperature compensation into the angle measurement paths 104/106 to account for deviations in the set of sensors 202/204 fabrication spread, nonlinearities, aging dependencies, and/or temperature dependencies which may result from the use of different types of sensors. In some implementations, the angle measurement paths 104/106 may also compensate harmonic components of the x-component signal and the y-component signal in order to achieve high accuracy of the angle measurement and high coverage of the safety path 108. The calibration and compensation of the angle measurement paths 104/106 can be done by parameters stored in an NVM based on end of line measurements and/or may utilize auto calibration algorithms, as discussed above.

As shown in FIG. 2A, the angle calculation component 210a receives the x-component value and the y-component value measured by the measuring element $206x_1$ and $206y_1$, respectively, and calculates the angular position $\theta_a$ by calculating an arctangent of the y-component divided by the x-component. In some implementations, the angle calculation component 210a calculates a vector length $r_a$ based on the x-component value and the y-component value, as described above. The angle calculation component 210a may provide one or more signals indicating the vector length $r_a$ computed from the x-component value and the y-component value (e.g., when the angle calculation component 210a is configured to compute the vector length $r_a$) to the vector length check component 212a and/or the one or more signals indicating the angular position $\theta_a$ to the angle compare component 218.

Similarly, the angle calculation component 210b receives the x-component value and the y-component value measured by the measuring element $206x_2$ and $206y_2$, respectively, and calculates the angular position $\theta_b$ by calculating an arctangent of the y-component divided by the x-component. In some implementations, the angle calculation component $210b$ calculates a vector length $r_b$ based on the x-component value and the y-component value, as described above. The angle calculation component $210b$ may provide one or more signals indicating the vector length $r_b$ computed from the x-component value and the y-component value (e.g., when the angle calculation component $210b$ is configured to compute the vector length $r_b$) to the vector length check component $212b$ and/or one or more signals indicating the angular position $\theta_b$ to the angle compare component 218.

The angle compare component 218 may receive one or more signals indicating the angular position $\theta_a$ and one or more signals indicating the angular position $\theta_b$ from the angle calculation component $210a$ and the angle calculation component $210b$, respectively. The angle compare component 218 may perform an angle comparison check based on the angular position $\theta_a$ and the angular position $\theta_b$. In some implementations, the angle compare component 218 may perform an angle comparison check based on the angular position $\theta_a$ and the angular position $\theta_b$ in a manner similar to that described above with respect to FIG. 1A. The angle compare component 218 may output a signal indicating a result of the angle comparison check to the digital output component 110.

As also shown in FIG. 2A, the vector length check component $212b$ receives the x-component value and the y-component value measured by the measuring element $206x_2$ and the measuring element $206y_2$, respectively, and performs a vector check based on the x-component value and the y-component value. In some implementations, the vector length check component $212b$ performs the vector check in a manner similar to that described above with respect to FIGS. 1A and 1B. The vector length check component $212b$ may output a signal indicating a result of the vector length check component to the digital output component 110.

As shown in FIG. 2A, the segment mapping component $214a$ receives the x-component value $x_1$ from the measuring element $206x_1$ and receives the y-component value $y_1$ from the measuring element $206y_1$. Similarly, the segment mapping component $214b$ receives the x-component value $x_2$ from the measuring element $206x_2$ and receives the y-component value $y_2$ from the measuring element $206y_2$.

The segment mapping component $214a$ may segment the measurement range of the set of angle sensing elements 202 to generate a plurality of segments. Each segment may be associated with a range of angles corresponding to the measurement range of the set of angle sensing elements 202. In some implementations, the segment mapping component $214a$ segments the measurement range associated with the sensing elements 202 based on detecting a zero crossing of the x-component signal (e.g., $x_1=0$), a zero crossing of the y-component signal (e.g., $y_1=0$), and one or more points corresponding to the absolute value of the x-component signal being equal to the absolute value of the y-component signal.

For example, as shown in FIG. 2B, the segment mapping component $214a$ may segment the 360° measurement range of the sensing elements 202 into a first 45° segment based on detecting a zero crossing of the y-component signal at point 220 and a point corresponding to the absolute value of the x-component signal being equal to the absolute value of the y-component signal at point 224. The segment mapping component $214a$ may segment the 360° measurement range of the sensing elements 202 into a second 45° segment based on detecting the point corresponding to the absolute value of the x-component signal being equal to the absolute value of the y-component signal at point 224 and a zero crossing of the x-component signal at point 228. The segment mapping component $214a$ may continue in a similar manner to segment the 360° measurement range of the sensing elements 202 into a series of 45° segments.

The segment mapping component $214b$ may segment the measurement range of the set of angle sensing elements 204 to generate a plurality of segments. Each segment may be associated with a range of angles corresponding to the measurement range of the set of angle sensing elements 204. In some implementations, the segment mapping component $214b$ segments the measurement range associated with the sensing elements 204 based on detecting a zero crossing of the x-component signal (e.g., $x_2=0$), a zero crossing of the y-component signal (e.g., $y_2=0$), and one or more points corresponding to the absolute value of the x-component signal being equal to the absolute value of the y-component signal.

For example, as shown in FIG. 2B, the segment mapping component $214b$ may segment the 180° measurement range of the sensing elements 204 into a first 22.5° segment based on detecting a zero crossing of the y-component signal at point 220 and a point corresponding to the absolute value of the x-component signal being equal to the absolute value of the y-component signal at point 222. The segment mapping component $214b$ may segment the 180° measurement range of the sensing elements 204 into a second 22.5° segment based on detecting the point corresponding to the absolute value of the x-component signal being equal to the absolute value of the y-component signal at point 222 and a zero crossing of the x-component signal at point 226. The segment mapping component $214b$ may continue in a similar manner to segment the 180° measurement range of the sensing elements 204 into a series of 22.5° segments.

The segment mapping component $214a$ may determine a segment that includes the x-component value $x_1$ and the y-component value $y_1$. The segment mapping component $214a$ may determine the segment based on a relationship between the x-component value $x_1$ and the y-component value $y_1$. The segment mapping component $214a$ may determine that the x-component value $x_1$ and the y-component value $y_1$ are included in a first segment corresponding to 0° through 45° when the x-component value $x_1$ is greater than the y-component value $y_1$ and the y-component value $y_1$ is greater than zero.

The segment mapping component $214a$ may determine that the x-component value $x_1$ and the y-component value $y_1$ are included in a second segment corresponding to 45° through 90° when the y-component value $y_1$ is greater than the x-component value $x_1$ and the x-component value $x_1$ is greater than zero.

The segment mapping component $214a$ may determine that the x-component value $x_1$ and the y-component value $y_1$ are included in a third segment corresponding to 90° through 135° when the y-component value $y_1$ is greater than the negative of the x-component value $x_1$ (e.g., $y_1 > -x_1$) and the negative of the x-component value $x_1$ is greater than zero.

The segment mapping component $214a$ may determine that the x-component value $x_1$ and the y-component value $y_1$ are included in a fourth segment corresponding to 135° through 180° when the negative of the x-component value $x_1$ is greater than the y-component value $y_1$ and the y-component value $y_1$ is greater than zero.

The segment mapping component 214a may determine that the x-component value $x_1$ and the y-component value $y_1$ are included in a fifth segment corresponding to 180° through 225° when the y-component value $y_1$ is less than zero and the x-component value $x_1$ is less than the y-component value $y_1$.

The segment mapping component 214a may determine that the x-component value $x_1$ and the y-component value $y_1$ are included in a sixth segment corresponding to 225° through 270° when the x-component value $x_1$ is less than zero and the y-component value $y_1$ is less than the x-component value $x_1$.

The segment mapping component 214a may determine that the x-component value $x_1$ and the y-component value $y_1$ are included in a seventh segment corresponding to 270° through 315° when the negative of the y-component value $y_1$ is greater than the x-component value $x_1$ and the x-component value $x_1$ is greater than zero.

The segment mapping component 214a may determine that the x-component value $x_1$ and the y-component value $y_1$ are included in an eighth segment corresponding to 315° through 360° when the x-component value $x_1$ is greater than the negative of the y-component value $y_1$ and the negative of the y-component value $y_1$ is greater than zero.

The segment mapping component 214b may determine a segment that includes the x-component value $x_2$ and the y-component value $y_2$. The segment mapping component 214b may determine the segment based on a relationship between the x-component value $x_2$ and the y-component value $y_2$. The segment mapping component 214b may determine that the x-component value $x_2$ and the y-component value $y_2$ are included in a first segment corresponding to 0° through 22.5° when the x-component value $x_2$ is greater than the y-component value $y_2$ and the y-component value $y_2$ is greater than zero.

The segment mapping component 214b may determine that the x-component value $x_2$ and the y-component value $y_2$ are included in a second segment corresponding to 22.5° through 45° when the y-component value $y_2$ is greater than the x-component value $x_2$ and the x-component value $x_2$ is greater than zero.

The segment mapping component 214b may determine that the x-component value $x_2$ and the y-component value $y_2$ are included in a third segment corresponding to 45° through 67.5° when the y-component value $y_2$ is greater than the negative of the x-component value $x_2$ and the negative of the x-component value $x_2$ is greater than zero.

The segment mapping component 214b may determine that the x-component value $x_2$ and the y-component value $y_2$ are included in a fourth segment corresponding to 67.5° through 90° when the negative of the x-component value $x_2$ is greater than the y-component value $y_2$ and the y-component value $y_2$ is greater than zero.

The segment mapping component 214b may determine that the x-component value $x_2$ and the y-component value $y_2$ are included in a fifth segment corresponding to 90° through 112.5° when the y-component value $y_2$ is less than zero and the x-component value $x_2$ is less than the y-component value $y_2$.

The segment mapping component 214b may determine that the x-component value $x_2$ and the y-component value $y_2$ are included in a sixth segment corresponding to 112.5° through 135° when the x-component value $x_2$ is less than zero and the y-component value $y_2$ is less than the x-component value $x_1$.

The segment mapping component 214b may determine that the x-component value $x_2$ and the y-component value $y_2$ are included in a seventh segment corresponding to 135° through 157.5° when the negative of the y-component value $y_2$ is greater than the x-component value $x_2$ and the x-component value $x_2$ is greater than zero.

The segment mapping component 214b may determine that the x-component value $x_2$ and the y-component value $y_2$ are included in an eighth segment corresponding to 157.5° through 180° when the x-component value $x_2$ is greater than the negative of the y-component value $y_2$ and the negative of the y-component value $y_2$ is greater than zero.

The segment mapping component 214b may determine that the x-component value $x_2$ and the y-component value $y_2$ are included in a ninth segment corresponding to 180° through 202.5° when the x-component value $x_2$ is greater than the y-component value $y_2$ and the y-component value $y_2$ is greater than zero.

The segment mapping component 214b may determine that the x-component value $x_2$ and the y-component value $y_2$ are included in a tenth segment corresponding to 202.5° through 225° when the y-component value $y_2$ is greater than the x-component value $x_2$ and the x-component value $x_2$ is greater than zero.

The segment mapping component 214b may determine that the x-component value $x_2$ and the y-component value $y_2$ are included in an eleventh segment corresponding to 225° through 247.5° when the y-component value $y_2$ is greater than the negative of the x-component value $x_2$ and the negative of the x-component value $x_2$ is greater than zero.

The segment mapping component 214b may determine that the x-component value $x_2$ and the y-component value $y_2$ are included in a twelfth segment corresponding to 247.5° through 270° when the negative of the x-component value $x_2$ is greater than the y-component value $y_2$ and the y-component value $y_2$ is greater than zero.

The segment mapping component 214b may determine that the x-component value $x_2$ and the y-component value $y_2$ are included in a thirteenth segment corresponding to 270° through 292.5° when the y-component value $y_2$ is less than zero and the x-component value $x_2$ is less than the y-component value $y_2$.

The segment mapping component 214b may determine that the x-component value $x_2$ and the y-component value $y_2$ are included in a fourteenth segment corresponding to 292.5° through 315° when the x-component value $x_2$ is less than zero and the y-component value $y_2$ is less than the x-component value $x_1$.

The segment mapping component 214b may determine that the x-component value $x_2$ and the y-component value $y_2$ are included in a fifteenth segment corresponding to 315° through 337.5° when the negative of the y-component value $y_2$ is greater than the x-component value $x_2$ and the x-component value $x_2$ is greater than zero.

The segment mapping component 214b may determine that the x-component value $x_2$ and the y-component value $y_2$ are included in a sixteenth segment corresponding to 337.5° through 360° when the x-component value $x_2$ is greater than the negative of the y-component value $y_2$ and the negative of the y-component value $y_2$ is greater than zero.

The segment mapping components 214a/214b may provide one or more signals indicating the determined segments to the segment comparison component 216. The segment comparison component 216 may determine whether the segment determined by the segment mapping component 214b is included within the segment determined by the segment mapping component 214a. For example, the segment comparison component 216 may determine whether a range of angles associated with the segment determined by the segment mapping component 214b is included within a range of angles associated with the segment determined by the segment mapping component 214a. The segment comparison component 216 may provide one or more signals indicating a positive result of the comparison to the digital output component 210 when the segment determined by the segment mapping component 214b is included within the segment determined by the segment mapping component 214a.

In some implementations, the segment comparison component 216 may provide one or more signals indicating a negative result of the comparison to the digital output component 210 when the segment determined by the segment mapping component 214b is not included within the segment determined by the segment mapping component 214a. In some implementations, the segment comparison component 216 may perform one or more additional safety checks when the segment determined by the segment mapping component 214b is not included within the segment determined by the segment mapping component 214a.

In some implementations, the borders for the segments for the 180° measurement range and the borders for the segments for the 360° measurement may align every 45°. The alignment of the borders and minor inaccuracies may cause the segment determined by the segment mapping component 214b to not be included within the segment determined by the segment mapping component 214a when the x-component values and/or the y-component values are close to (e.g., within a threshold number of degrees) aligned borders.

Figure 2C:
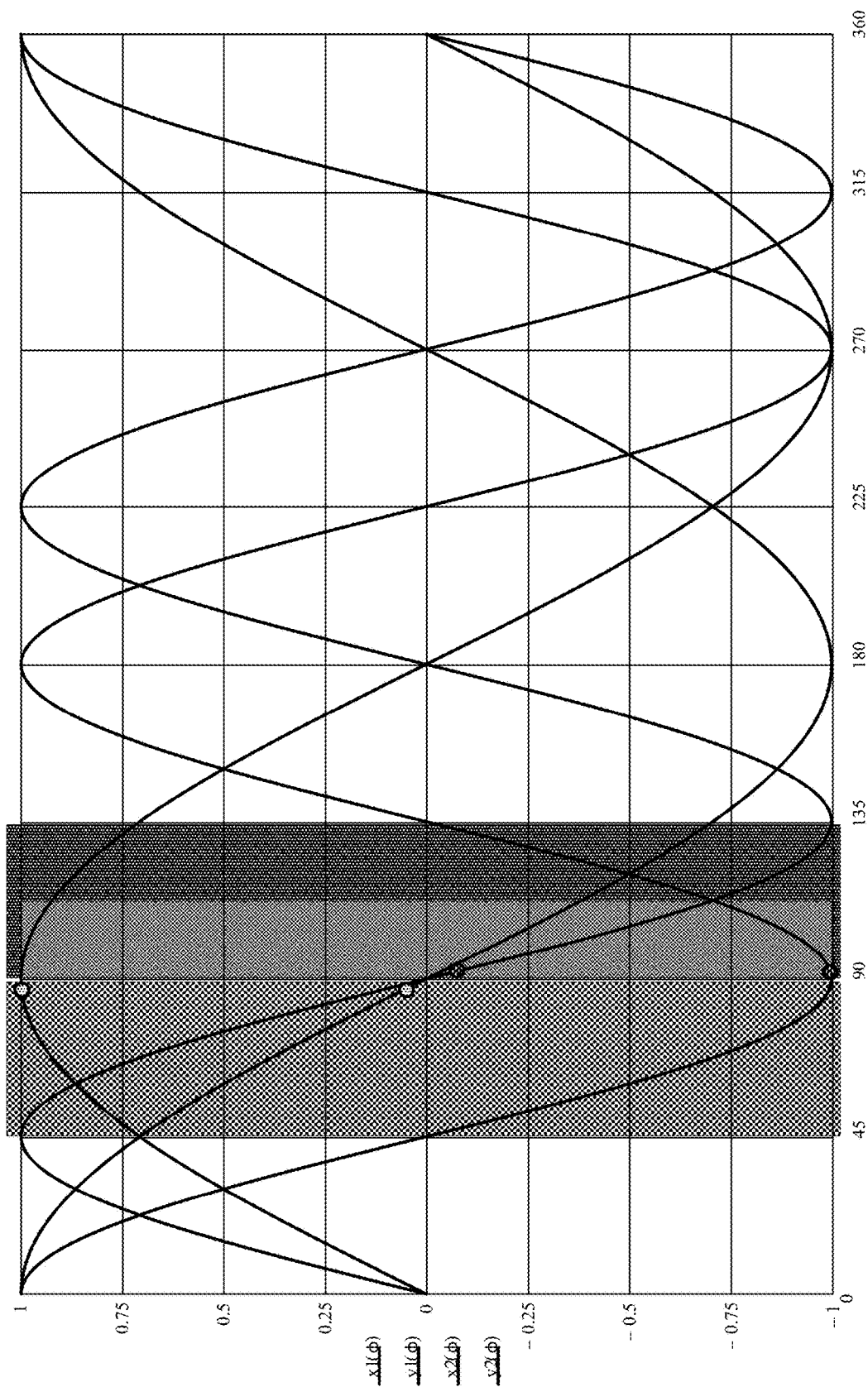

For example, as shown in FIG. 2C, the x-component value $x_1$ and the y-component value $y_1$ are adjacent to the 90° border of the second segment of the 360° measurement range and the x-component value $x_2$ and the y-component value $y_2$ are adjacent to the 90° border of the fifth segment of the 180° measurement range. The segment comparison component 216 may perform a safety check to determine whether the segment determined by the segment mapping component 214b is adjacent to the segment determined by the segment mapping component 214a. The segment comparison component 216 may provide one or more signals indicating a positive result of the comparison to the digital output component 210 when the segment determined by the segment mapping component 214b is adjacent to the segment determined by the segment mapping component 214a.

In some implementations, the segment comparison component 216 may determine whether the common border of the identified segments is a multiple of 90° (e.g., 0°, 90°, 180°, 270°, 360°). For example, as shown in FIG. 2C, the x-components and the y-components may be adjacent to the 90° border. The segment comparison component 216 may perform an additional safety check based on the common border of the identified segments being a multiple of 90°. In some implementations, the segment comparison component 216 may determine whether the x-component value $x_1$ and the y-component $y_1$ are close to the common border (e.g., within a particular quantity of degrees). The segment comparison component 216 may determine that the x-component value $x_1$ and the y-component $y_1$ are close to the common border when the absolute value of the x-component value $x_1$ and the y-component $y_1$ that is closest to zero is smaller than the absolute value of the other one of the x-component value $x_1$ and the y-component $y_1$ by a factor m. The factor m may be a multiple of 2 and within the range of 2 through 64. A higher value of the factor m may provide a higher accuracy relative to a lower value of the factor m.

In some implementations, the common border is at 90° or 270°. The segment comparison component 216 may determine that the x-component value $x_1$ and the y-component value $y_1$ are close to the common 90° or 270° border when the absolute value of the x-component value $x_1$ multiplied by the factor m is less than the absolute value of the y-component value $y_1$.

In some implementations, the common border is at 0°, 180°, or 360°. The segment comparison component 216 may determine that the x-component value $x_1$ and the y-component value $y_1$ are close to the common 0°, 180°, or 360° border when the absolute value of the y-component value $y_1$ multiplied by the factor m is less than the absolute value of the x-component value $x_1$.

In some implementations, the segment comparison component 216 may determine whether the common border of the identified segments is a multiple of 90°+45° (e.g., 45°, 135°, 225°, 315°). The segment comparison component 216 may perform an additional safety check based on the common border of the identified segments being a multiple of 90°+45°. In some implementations, the segment comparison component 216 may determine whether the x-component value $x_1$ and the y-component $y_1$ are close to the common border (e.g., within a particular quantity of degrees). The segment comparison component 216 may determine that the x-component value $x_1$ and the y-component $y_1$ are close to the common border when the absolute value of the x-component value $x_1$ minus the absolute value of the y-component $y_1$ is less than a value r. The value r may be the absolute value of the x-component value $x_1$ divided by a factor k, the absolute value of the y-component value $y_1$ divided by a factor k, or the sum of the absolute value of the x-component value $x_1$ and the y-component value $y_1$ divided by two times the factor k. The factor k may be a multiple of 2 and may be within the range of 2 through 64. A higher value of the factor k may provide a higher accuracy relative to a lower value of the factor k. In some implementations, the factor k is the same as the factor m. In some implementations, the factor k is different from the factor m.

In some implementations, the common border is at 90° or 270°. The segment comparison component 216 may determine that the x-component value $x_1$ and the y-component value $y_1$ are close to the common 90° or 270° border when the absolute value of the x-component value $x_1$ multiplied by the factor m is less than the absolute value of the y-component value $y_1$.

In some implementations, the common border is at 0°, 180°, or 360°. The segment comparison component 216 may determine that the x-component value $x_1$ and the y-component value $y_1$ are close to the common 0°, 180°, or 360° border when the absolute value of the y-component value $y_1$ multiplied by the factor m is less than the absolute value of the x-component value $x_1$.

Figure 2D:
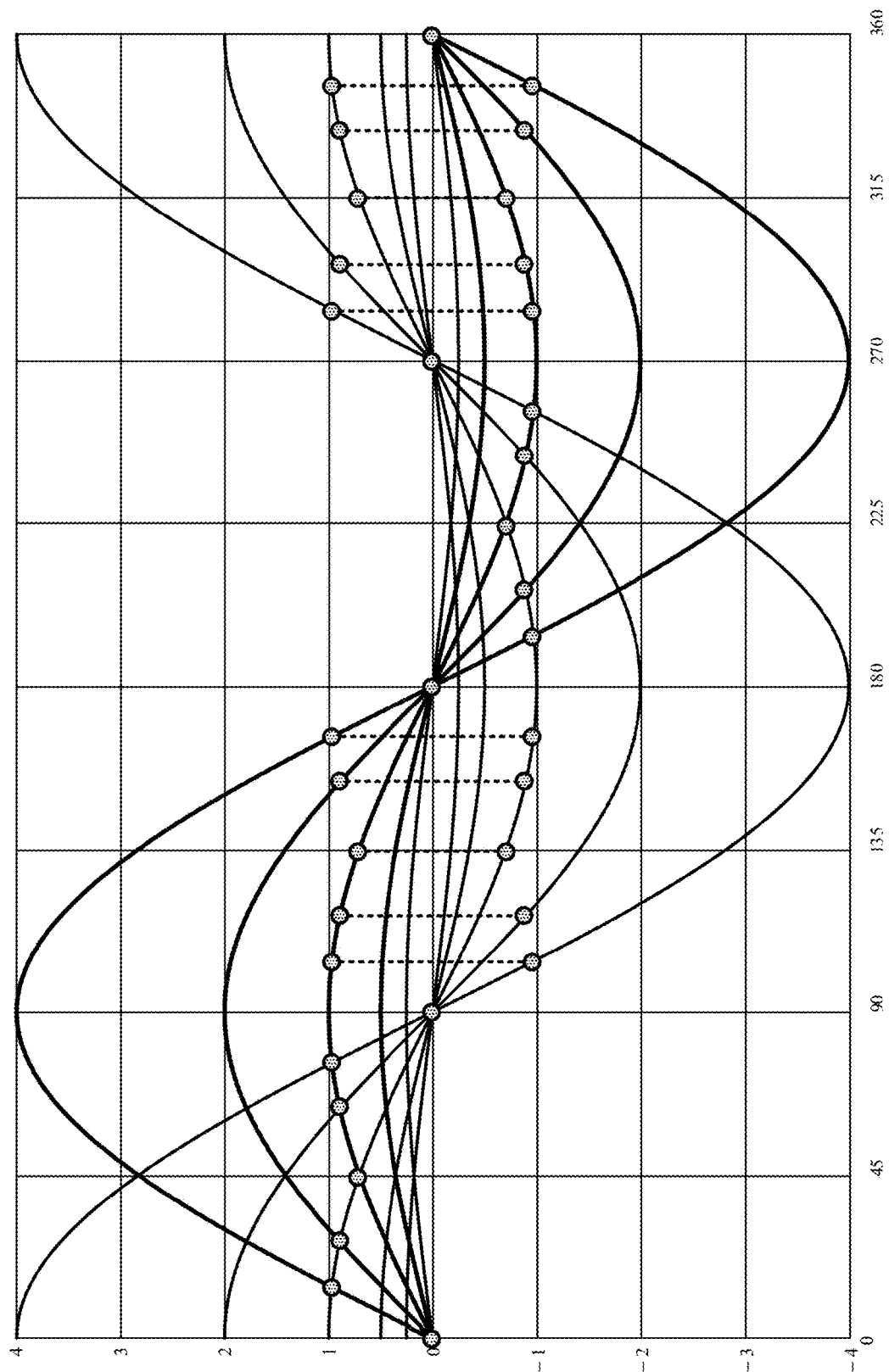

In some implementations, the segment comparison component 216 further segments the segments of the 360° measurement range based on the segment identified by the segment mapping component 214b not being within the segment identified by the segment mapping component 214a. For example, as shown in FIG. 2D, the segment comparison component 216 may further segment each 45° segment into three additional segments. The segment comparison component 216 may determine whether the x-component value $x_2$ and the y-component value $y_2$ are in a segment within, and/or adjacent to, an additional segment that includes the x-component value $x_1$ and the y-component value $y_1$. In some implementations, the segment comparison component 216 may determine whether the x-component value $x_2$ and the y-component value $y_2$ are in a segment within, and/or adjacent to, an additional segment that includes the x-component value $x_1$ and the y-component value $y_1$ in a manner similar to that described above.

The number and arrangement of elements shown in FIGS. 2A-2D are provided as an example. In practice, there may be additional elements, fewer elements, different elements, or differently arranged elements than those shown in FIGS. 2A-2D.

Figure 3:
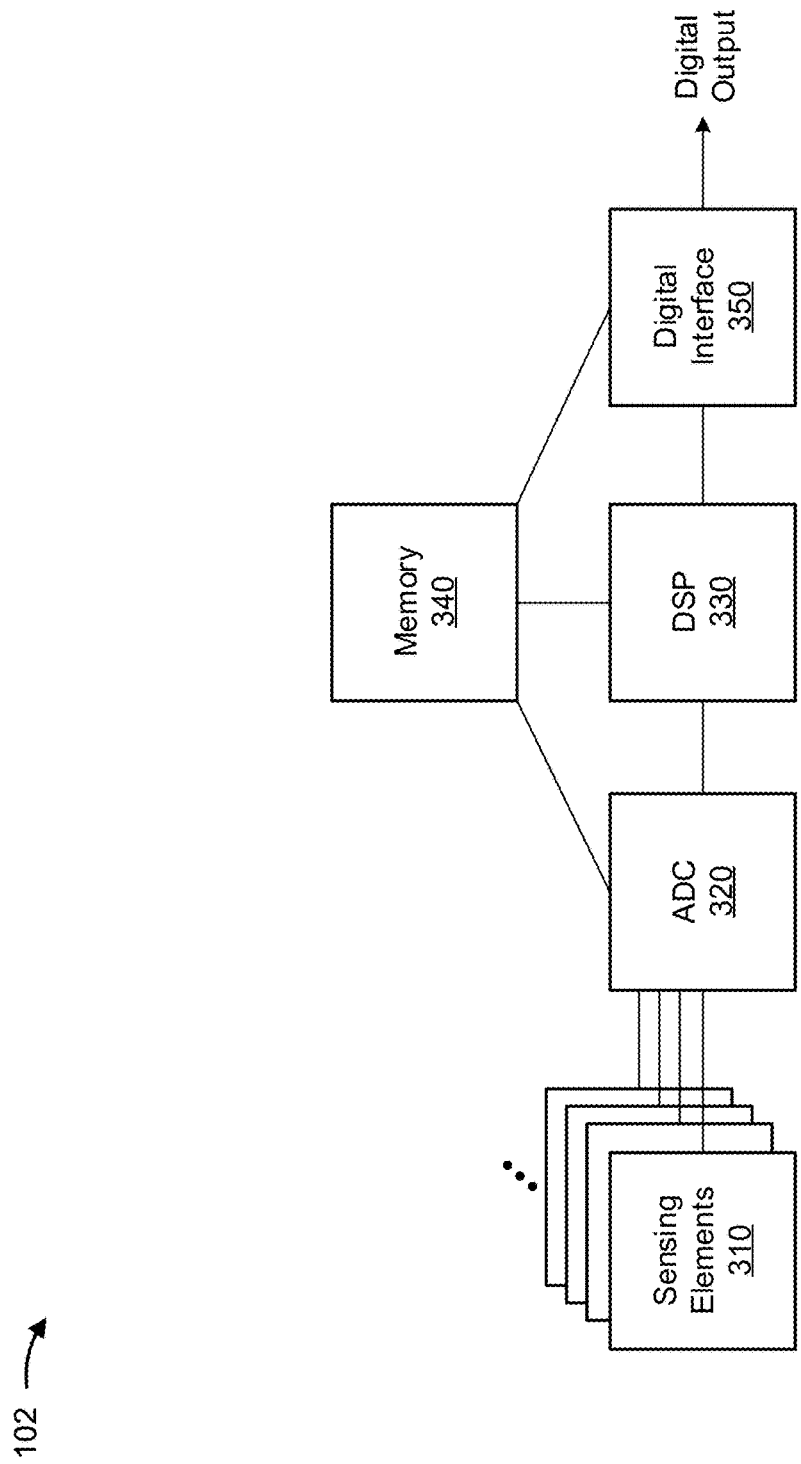
FIG. 3 is a diagram illustrating example hardware elements of an angle sensor described herein.

FIG. 3 is a diagram illustrating example hardware elements of angle sensor 102. As shown, angle sensor 102 may include sensing elements 310 (e.g., comprising at least two sets of elements), an ADC 320, a DSP 330, a memory element 340, and/or a digital interface 350.

Sensing element 310 includes an element for sensing a magnetic field present at sensing element 310. For example, sensing element 310 may include one or more Hall-based sensing elements that operate based on a Hall effect. As another example, sensing element 310 may include one or more magnetoresistive (MR) based sensing elements, where the electrical resistance of the magnetoresistive material may depend on a strength and/or a direction of the magnetic field present at the magnetoresistive material. Here, sensing element 310 may operate based on an anisotropic magnetoresistance (AMR) effect, a giant magnetoresistance (GMR) effect, a tunnel magnetoresistance (TMR) effect, and/or the like. As an additional example, sensing element 310 may include one or more variable reluctance (VR) based sensing elements that operate based on induction. In some implementations, a set of angle sensing elements 202 (e.g., sensing element 202x and sensing element 202y) and/or a set of angle sensing elements 204 (e.g., sensing element 204x and sensing element 204y) comprise one or more sensing elements 310.

ADC 320 includes one or more analog-to-digital converters that convert analog signals from sensing elements 310 to digital signals. For example, ADC 320 may convert an analog signal received from a set of angle sensing elements 310 to a digital signal to be processed by DSP 330. In some implementations, ADC 320 may provide a digital signal to DSP 330. In some implementations, angle sensor 102 may include one or more ADCs 320.

DSP 330 may include a digital signal processing device or a collection of digital signal processing devices. In some implementations, DSP 330 may receive digital signals from ADC 320 and may process the digital signals in association with selective performance of one or more safety checks, as described herein. In some implementations, DSP 330 may process the digital signals in order to form output signals, such as output signals associated with an angular position of a target object.

Memory element 340 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by angle sensor 102, as described herein. In some implementations, memory element 340 may store information associated with processing performed by DSP 330. Additionally, or alternatively, memory element 340 may store configurational values or parameters for sensing element 310 and/or information for one or more other elements of angle sensor 102, such as ADC 320 or digital interface 350.

Digital interface 350 may include an interface via which angle sensor 102 may receive and/or provide information from and/or to another device, such controller 112. For example, digital interface 350 may provide the output signal determined by DSP 330 to controller 112 and may receive information from controller 112.

The number and arrangement of elements shown in FIG. 3 are provided as an example. In practice, there may be additional elements, fewer elements, different elements, or differently arranged elements than those shown in FIG. 3. For example, angle sensor 102 may include one or more elements not shown in FIG. 3, such as a clock, an analog regulator, a digital regulator, a protection element, a temperature sensor, a stress sensor, and/or the like.

Figure 4:
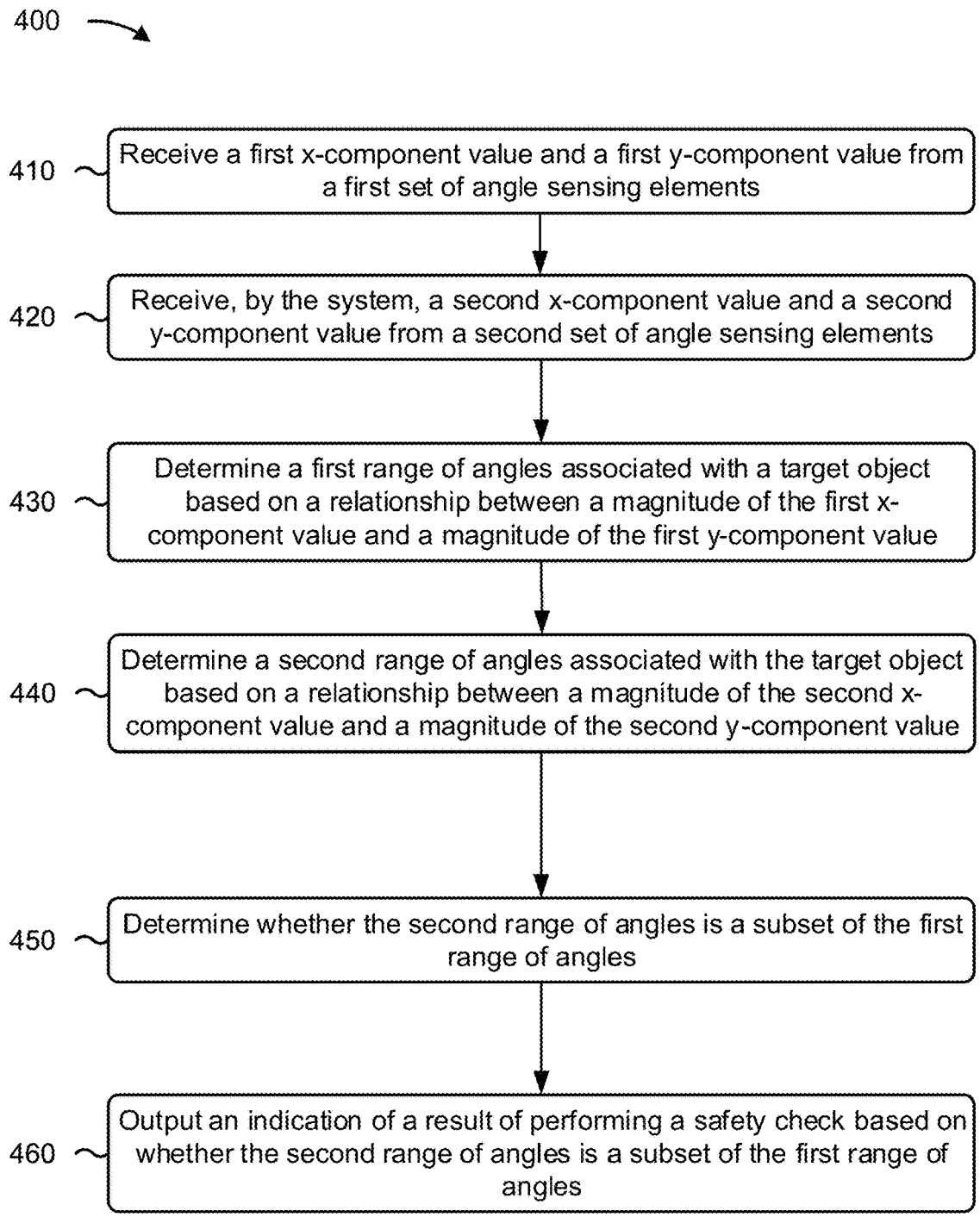
FIG. 4 is a flowchart of an example processes relating to a safety mechanism for an angle sensor.

FIG. 4 is a flowchart of an example process 400 associated with safety mechanism for angle sensors using segmentation. In some implementations, one or more process blocks of FIG. 4 may be performed by an angle sensor (e.g., sensor 102). In some implementations, one or more process blocks of FIG. 4 may be performed by another device or a group of devices separate from or including the angle sensor, such as a controller (e.g., controller 112).

As shown in FIG. 4, process 400 may include receiving a first x-component value and a first y-component value from a first set sensing elements (block 410). For example, the angle sensor may receive a first x-component value and a first y-component value from a first set sensing elements, as described above.

As further shown in FIG. 4, process 400 may include receiving a second x-component value and a second y-component value from a second set of angle sensing elements (block 420). For example, the angle sensor may receive a second x-component value and a second y-component value from a second set of angle sensing elements, as described above.

As further shown in FIG. 4, process 400 may include performing a safety check including determining a first range of angles associated with a target object based on a relationship between a magnitude of the first x-component value and a magnitude of the first y-component value (block 430). For example, the angle sensor may perform a safety check including determining a first range of angles associated with a target object based on a relationship between a magnitude of the first x-component value and a magnitude of the first y-component value, as described above.

As further shown in FIG. 4, process 400 may include determining a second range of angles associated with the target object based on a relationship between a magnitude of the second x-component value and a magnitude of the second y-component value (block 440). For example, the angle sensor may determine a second range of angles associated with the target object based on a relationship between a magnitude of the second x-component value and a magnitude of the second y-component value, as described above.

As further shown in FIG. 4, process 400 may include determining whether the second range of angles is a subset of the first range of angles (block 450). For example, the angle sensor may determine whether the second range of angles is a subset of the first range of angles, as described above.

As further shown in FIG. 4, process 400 may include outputting an indication of a result of performing the safety check based on whether the second range of angles is a subset of the first range of angles (block 460). For example, the angle sensor may output an indication of a result of performing the safety check based on whether the second range of angles is a subset of the first range of angles, as described above.

Process 400 may include additional implementations, such as any single implementation or any combination of implementations described below and/or in connection with one or more other processes described elsewhere herein.

In a first implementation, determining the first range of angles comprises determining that the first range of angles is a range of angles from zero degrees to forty-five degrees when the first x-component value is greater than the first y-component value and the first y-component value is greater than zero, determining that the first range of angles is a range of angles from forty-five degrees to ninety degrees when the first y-component value is greater than the first x-component value and the first x-component value is greater than zero, determining that the first range of angles is a range of angles from ninety degrees to 135 degrees when the first y-component value is greater than a negative of the first x-component value and the negative of the first x-component value is greater than zero, determining that the first range of angles is a range of angles from 135 degrees to 180 degrees when the negative of the first x-component value is greater than the first y-component value and the first y-component value is greater than zero, determining that the first range of angles is a range of angles from 180 degrees to 225 degrees when the first y-component value is less than zero and the first x-component value is less than the first y-component value, determining that the first range of angles is a range of angles from 225 degrees to 270 degrees when the first x-component value is less than zero and the first y-component value is less than the first x-component value, determining that the first range of angles is a range of angles from 270 degrees to 315 degrees when the negative of the first y-component value is greater than the first x-component value and the first x-component value is greater than zero, and determining that the first range of angles is a range of angles from 315 degrees to 360 degrees when the first x-component value is greater than the negative of the first y-component value and the negative of the first y-component value is greater than zero.

In a second implementation, alone or in combination with the first implementation, determining the second range of angles comprises determining that the second range of angles is a range of angles from zero degrees to 22.5 degrees when the second x-component value is greater than the second y-component value and the second y-component value is greater than zero, determining that the second range of angles is a range of angles from 22.5 degrees to forty-five degrees when the second y-component value is greater than the second x-component value and the second x-component value is greater than zero, determining that the second range of angles is a range of angles from forty-five degrees to 67.5 degrees when the second y-component value is greater than a negative of the second x-component value and the negative of the second x-component value is greater than zero, determining that the second range of angles is a range of angles from 67.5 degrees to ninety degrees when the negative of the second x-component value is greater than the second y-component value and the second y-component value is greater than zero, determining that the second range of angles is a range of angles from ninety degrees to 112.5 degrees when the second y-component value is less than zero and the second x-component value is less than the second y-component value, determining that the second range of angles is a range of angles from 112.5 degrees to 135 degrees when the second x-component value is less than zero and the second y-component value is less than the second x-component value, determining that the second range of angles is a range of angles from 135 degrees to 157.5 degrees when the negative of the second y-component value is greater than the second x-component value and the second x-component value is greater than zero, and determining that the second range of angles is a range of angles from 157.5 degrees to 180 degrees when the second x-component value is greater than the negative of the second y-component value and the negative of the second y-component value is greater than zero.

In a third implementation, alone or in combination with one or more of the first and second implementations, determining the second range of angles comprises determining that the second range of angles is a range of angles from 180 degrees to 202.5 degrees when the second x-component value is greater than the second y-component value and the second y-component value is greater than zero, determining that the second range of angles is a range of angles from 202.5 degrees to 225 degrees when the second y-component value is greater than the second x-component value and the second x-component value is greater than zero, determining that the second range of angles is a range of angles from 225 degrees to 247.5 degrees when the second y-component value is greater than a negative of the second x-component value and the negative of the second x-component value is greater than zero, determining that the second range of angles is a range of angles from 247.5 degrees to 270 degrees when the negative of the second x-component value is greater than the second y-component value and the second y-component value is greater than zero, determining that the second range of angles is a range of angles from 270 degrees to 292.5 degrees when the second y-component value is less than zero and the second x-component value is less than the second y-component value, determining that the second range of angles is a range of angles from 292.5 degrees to 315 degrees when the second x-component value is less than zero and the second y-component value is less than the second x-component value, determining that the second range of angles is a range of angles from 315 degrees to 337.5 degrees when the negative of the second y-component value is greater than the second x-component value and the second x-component value is greater than zero, and determining that the second range of angles is a range of angles from 337.5 degrees to 360 degrees when the second x-component value is greater than the negative of the second y-component value and the negative of the second y-component value is greater than zero.

In a fourth implementation, alone or in combination with one or more of the first through third implementations, performing the safety check further includes determining that a largest angle included in the first range of angles is equal to a smallest angle included in the second range of angles, wherein the indication of the result includes an indication of a positive result of performing the safety check based on the largest angle included in the first range of angles being equal to the smallest angle included in the second range of angles.

In a fifth implementation, alone or in combination with one or more of the first through fourth implementations, performing the safety check further includes determining that a smallest angle included in the first range of angles is equal to a largest angle included in the second range of angles, wherein the indication of the result includes an indication of a positive result of performing the safety check based on the smallest angle included in the first range of angles being equal to the largest angle included in the second range of angles.

In a sixth implementation, alone or in combination with one or more of the first through fifth implementations, performing the safety check further includes determining that the first range of angles includes ninety degrees or 270 degrees, and determining whether the first x-component value, multiplied by a first factor, is less than the first y-component value, wherein the indication of the result includes an indication of a positive result of performing the safety check when the first x-component value, multiplied by the first factor, is less than the first y-component value.

In a seventh implementation, alone or in combination with one or more of the first through sixth implementations, performing the safety check further includes determining that the first range of angles includes zero degrees, 180 degrees, or 360 degrees, and determining whether the first y-component value, multiplied by a first factor, is less than the first x-component value, wherein the indication of the result includes an indication of a positive result of performing the safety check when the first y-component value, multiplied by the first factor, is less than the first x-component value.

In an eighth implementation, alone or in combination with one or more of the first through seventh implementations, performing the safety check further includes determining that the first range of angles includes 45 degrees or 135 degrees, and determining whether a difference between an absolute value of the first x-component value and an absolute value of the first y-component value satisfies a threshold, wherein the indication of the result includes an indication of a positive result of performing the safety check when difference of the absolute value of the first x-component value and the absolute value of the first y-component value satisfies the threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a system and via a first angle measurement path, a first x-component value and a first y-component value from a first set of angle sensing elements, wherein the first set of angle sensing elements are associated with a first measurement range;
   receiving, by the system and via a second angle measurement path, a second x-component value and a second y-component value from a second set of angle sensing elements, wherein the second set of angle sensing elements are associated with a second measurement range that is different from the first measurement range;
   performing, by the system, a safety check including:
      segmenting, based on an intersection of an x-component signal and a y-component signal associated with the first set of angle sensing elements, the first measurement range into a plurality of first segments;
      segmenting, based on an intersection of an x-component signal and a y-component signal associated with the second set of angle sensing elements, the second measurement range into a plurality of second segments;
      determining a first segment, of the plurality of first segments, corresponding to a first range of angles associated with a target object based on a relationship between a magnitude of the first x-component value and a magnitude of the first y-component value;
      determining a second segment, of the plurality of second segments, corresponding to a second range of angles associated with the target object based on a relationship between a magnitude of the second x-component value and a magnitude of the second y-component value; and
      determining whether the second range of angles is a subset of the first range of angles; and
   outputting, by the system and to a controller, a signal corresponding to an indication of a result of performing the safety check based on whether the second range of angles is a subset of the first range of angles, wherein the indication of the result of performing the safety check indicates whether a failure, an error, or a deactivation is associated with one or more of the first angle measurement path or the second angle measurement path, and wherein the controller performs one or more operations associated with controlling one or more of an electrical system or an electrical subsystem based on the indication.

2. The method of claim 1, wherein determining the first range of angles comprises:
  determining that the first range of angles is a range of angles from zero degrees to forty-five degrees when the first x-component value is greater than the first y-component value and the first y-component value is greater than zero;
  determining that the first range of angles is a range of angles from forty-five degrees to ninety degrees when the first y-component value is greater than the first x-component value and the first x-component value is greater than zero;
  determining that the first range of angles is a range of angles from ninety degrees to 135 degrees when the first y-component value is greater than a negative of the first x-component value and the negative of the first x-component value is greater than zero;
  determining that the first range of angles is a range of angles from 135 degrees to 180 degrees when the negative of the first x-component value is greater than the first y-component value and the first y-component value is greater than zero;
  determining that the first range of angles is a range of angles from 180 degrees to 225 degrees when the first y-component value is less than zero and the first x-component value is less than the first y-component value;
  determining that the first range of angles is a range of angles from 225 degrees to 270 degrees when the first x-component value is less than zero and the first y-component value is less than the first x-component value;
  determining that the first range of angles is a range of angles from 270 degrees to 315 degrees when the negative of the first y-component value is greater than the first x-component value and the first x-component value is greater than zero; and
  determining that the first range of angles is a range of angles from 315 degrees to 360 degrees when the first x-component value is greater than the negative of the first y-component value and the negative of the first y-component value is greater than zero.

3. The method of claim 1, wherein determining the second range of angles comprises:
  determining that the second range of angles is a range of angles from zero degrees to 22.5 degrees when the second x-component value is greater than the second y-component value and the second y-component value is greater than zero;
  determining that the second range of angles is a range of angles from 22.5 degrees to forty-five degrees when the second y-component value is greater than the second x-component value and the second x-component value is greater than zero;
  determining that the second range of angles is a range of angles from forty-five degrees to 67.5 degrees when the second y-component value is greater than a negative of the second x-component value and the negative of the second x-component value is greater than zero;
  determining that the second range of angles is a range of angles from 67.5 degrees to ninety degrees when the negative of the second x-component value is greater than the second y-component value and the second y-component value is greater than zero;
  determining that the second range of angles is a range of angles from ninety degrees to 112.5 degrees when the second y-component value is less than zero and the second x-component value is less than the second y-component value;
  determining that the second range of angles is a range of angles from 112.5 degrees to 135 degrees when the second x-component value is less than zero and the second y-component value is less than the second x-component value;
  determining that the second range of angles is a range of angles from 135 degrees to 157.5 degrees when the negative of the second y-component value is greater than the second x-component value and the second x-component value is greater than zero; and
  determining that the second range of angles is a range of angles from 157.5 degrees to 180 degrees when the second x-component value is greater than the negative of the second y-component value and the negative of the second y-component value is greater than zero.

4. The method of claim 1, wherein determining the second range of angles comprises:
  determining that the second range of angles is a range of angles from 180 degrees to 202.5 degrees when the second x-component value is greater than the second y-component value and the second y-component value is greater than zero;
  determining that the second range of angles is a range of angles from 202.5 degrees to 225 degrees when the second y-component value is greater than the second x-component value and the second x-component value is greater than zero;
  determining that the second range of angles is a range of angles from 225 degrees to 247.5 degrees when the second y-component value is greater than a negative of the second x-component value and the negative of the second x-component value is greater than zero;
  determining that the second range of angles is a range of angles from 247.5 degrees to 270 degrees when the negative of the second x-component value is greater than the second y-component value and the second y-component value is greater than zero;
  determining that the second range of angles is a range of angles from 270 degrees to 292.5 degrees when the second y-component value is less than zero and the second x-component value is less than the second y-component value;
  determining that the second range of angles is a range of angles from 292.5 degrees to 315 degrees when the second x-component value is less than zero and the second y-component value is less than the second x-component value;
  determining that the second range of angles is a range of angles from 315 degrees to 337.5 degrees when the negative of the second y-component value is greater than the second x-component value and the second x-component value is greater than zero; and
  determining that the second range of angles is a range of angles from 337.5 degrees to 360 degrees when the second x-component value is greater than the negative of the second y-component value and the negative of the second y-component value is greater than zero.

5. The method of claim 1, wherein performing the safety check further includes:
  determining that a largest angle included in the first range of angles is equal to a smallest angle included in the second range of angles or that a smallest angle included in the first range of angles is equal to a largest angle included in the second range of angles,
    wherein the indication of the result includes an indication of a positive result of performing the safety check based on the largest angle included in the first range of angles being equal to the smallest angle included in the second range of angles or based on the smallest angle included in the first range of angles being equal to the largest angle included in the second range of angles.

6. The method of claim 1, wherein performing the safety check further includes:
  determining that the first range of angles includes ninety degrees or 270 degrees; and
  determining whether the first x-component value, multiplied by a first factor, is less than the first y-component value,
    wherein the indication of the result includes an indication of a positive result of performing the safety check when the first x-component value, multiplied by the first factor, is less than the first y-component value.

7. The method of claim 1, wherein performing the safety check further includes:
  determining that the first range of angles includes zero degrees, 180 degrees, or 360 degrees; and
  determining whether the first y-component value, multiplied by a first factor, is less than the first x-component value,
    wherein the indication of the result includes an indication of a positive result of performing the safety check when the first y-component value, multiplied by the first factor, is less than the first x-component value.

8. The method of claim 1, wherein performing the safety check further includes:
  determining that the first range of angles includes 45 degrees or 135 degrees; and
  determining whether a difference between an absolute value of the first x-component value and an absolute value of the first y-component value satisfies a threshold,
    wherein the indication of the result includes an indication of a positive result of performing the safety check when difference of the absolute value of the first x-component value and the absolute value of the first y-component value satisfies the threshold.

9. The method of claim 8, further comprising:
  determining the threshold based on:
    dividing the absolute value of the first x-component value by a value;
    dividing the absolute value of the first y-component value by the value; or
    dividing a sum of the absolute value of the first x-component value and the absolute value of the first y-component value by a multiple of the value.

10. An angle sensor, comprising:
  a first angle measurement path to determine a first x-component value and a first y-component value based on sensor values from a first set sensing elements, wherein the first set of angle sensing elements are associated with a first measurement range;
  a second angle measurement path to determine a second x-component value and a second y-component value based on sensor values from a second set of angle sensing elements, wherein the second set of angle sensing elements are associated with a second measurement range that is different from the first measurement range;
  a safety path to perform a safety check, the safety path being configured to:
    segment, based on an intersection of an x-component signal and a y-component signal associated with the first set of angle sensing elements, the first measurement range into a plurality of first segments;
    segment, based on an intersection of an x-component signal and a y-component signal associated with the second set of angle sensing elements, the second measurement range into a plurality of second segments;
    determine a first segment, of the plurality of first segments, corresponding to a first range of angles associated with a target object based on a relationship between the first x-component value and the first y-component value;
    determine a second segment, of the plurality of second segments, corresponding to a second range of angles associated with the target object based on a relationship between the second x-component value and the second y-component value; and
    determine whether the second range of angles is a subset of the first range of angles; and
  an output component to provide, to a controller, an indication of a result of performing the safety check based on whether the second range of angles is a subset of the first range of angles, wherein the indication of the result of performing the safety check indicates whether a failure, an error, or a deactivation is associated with one or more of the first angle measurement path or the second angle measurement path, and wherein the controller performs one or more operations associated with controlling one or more of an electrical system or an electrical subsystem based on the indication.

11. The angle sensor of claim 10, wherein the safety path, to determine the first range of angles, is configured to:
  determine that the first range of angles is a range of angles from zero degrees to forty-five degrees when the first x-component value is greater than the first y-component value and the first y-component value is greater than zero;
  determine that the first range of angles is a range of angles from forty-five degrees to ninety degrees when the first y-component value is greater than the first x-component value and the first x-component value is greater than zero;
  determine that the first range of angles is a range of angles from ninety degrees to 135 degrees when the first y-component value is greater than a negative of the first x-component value and the negative of the first x-component value is greater than zero;
  determine that the first range of angles is a range of angles from 135 degrees to 180 degrees when the negative of the first x-component value is greater than the first y-component value and the first y-component value is greater than zero;
  determine that the first range of angles is a range of angles from 180 degrees to 225 degrees when the first y-component value is less than zero and the first x-component value is less than the first y-component value;

determine that the first range of angles is a range of angles from 225 degrees to 270 degrees when the first x-component value is less than zero and the first y-component value is less than the first x-component value;

determine that the first range of angles is a range of angles from 270 degrees to 315 degrees when the negative of the first y-component value is greater than the first x-component value and the first x-component value is greater than zero; and determine that the first range of angles is a range of angles from 315 degrees to 360 degrees when the first x-component value is greater than the negative of the first y-component value and the negative of the first y-component value is greater than zero.

12. The angle sensor of claim 10, wherein the safety path, to determine the second range of angles, is configured to:

determine that the second range of angles is a range of angles from zero degrees to 22.5 degrees when the second x-component value is greater than the second y-component value and the second y-component value is greater than zero;

determine that the second range of angles is a range of angles from 22.5 degrees to forty-five degrees when the second y-component value is greater than the second x-component value and the second x-component value is greater than zero;

determine that the second range of angles is a range of angles from forty-five degrees to 67.5 degrees when the second y-component value is greater than a negative of the second x-component value and the negative of the second x-component value is greater than zero;

determine that the second range of angles is a range of angles from 67.5 degrees to ninety degrees when the negative of the second x-component value is greater than the second y-component value and the second y-component value is greater than zero;

determine that the second range of angles is a range of angles from ninety degrees to 112.5 degrees when the second y-component value is less than zero and the second x-component value is less than the second y-component value;

determine that the second range of angles is a range of angles from 112.5 degrees to 135 degrees when the second x-component value is less than zero and the second y-component value is less than the second x-component value;

determine that the second range of angles is a range of angles from 135 degrees to 157.5 degrees when the negative of the second y-component value is greater than the second x-component value and the second x-component value is greater than zero; and determine that the second range of angles is a range of angles from 157.5 degrees to 180 degrees when the second x-component value is greater than the negative of the second y-component value and the negative of the second y-component value is greater than zero.

13. The angle sensor of claim 10, wherein the safety path, to determine the second range of angles, is configured to:

determine that the second range of angles is a range of angles from 180 degrees to 202.5 degrees when the second x-component value is greater than the second y-component value and the second y-component value is greater than zero;

determine that the second range of angles is a range of angles from 202.5 degrees to 225 degrees when the second y-component value is greater than the second x-component value and the second x-component value is greater than zero;

determine that the second range of angles is a range of angles from 225 degrees to 247.5 degrees when the second y-component value is greater than a negative of the second x-component value and the negative of the second x-component value is greater than zero;

determine that the second range of angles is a range of angles from 247.5 degrees to 270 degrees when the negative of the second x-component value is greater than the second y-component value and the second y-component value is greater than zero;

determine that the second range of angles is a range of angles from 270 degrees to 292.5 degrees when the second y-component value is less than zero and the second x-component value is less than the second y-component value;

determine that the second range of angles is a range of angles from 292.5 degrees to 315 degrees when the second x-component value is less than zero and the second y-component value is less than the second x-component value;

determine that the second range of angles is a range of angles from 315 degrees to 337.5 degrees when the negative of the second y-component value is greater than the second x-component value and the second x-component value is greater than zero; and determine that the second range of angles is a range of angles from 337.5 degrees to 360 degrees when the second x-component value is greater than the negative of the second y-component value and the negative of the second y-component value is greater than zero.

14. The angle sensor of claim 10, wherein the safety path, to perform the safety check, is configured to:

determine that a largest angle included in the first range of angles is equal to a smallest angle included in the second range of angles or that a smallest angle included in the first range of angles is equal to a largest angle included in the second range of angles, wherein the indication of the result includes an indication of a positive result of performing the safety check based on the largest angle included in the first range of angles being equal to the smallest angle included in the second range of angles or based on the smallest angle included in the first range of angles being equal to the largest angle included in the second range of angles.

15. The angle sensor of claim 10, wherein the safety path, to perform the safety check, is configured to:

determine that the first range of angles includes ninety degrees or 270 degrees; and determine whether the first x-component value, multiplied by a first factor, is less than the first y-component value, wherein the indication of the result includes an indication of a positive result of performing the safety check when the first x-component value, multiplied by the first factor, is less than the first y-component value.

16. The angle sensor of claim 10, wherein the safety path, to perform the safety check, is configured to:

determine that the first range of angles includes zero degrees, 180 degrees, or 360 degrees; and determine whether the first y-component value, multiplied by a first factor, is less than the first x-component value, wherein the indication of the result includes an indication of a positive result of performing the safety check when the first y-component value, multiplied by the first factor, is less than the first x-component value.

17. The angle sensor of claim 10, wherein the safety path, to perform the safety check, is configured to:
determine that the first range of angles includes 45 degrees or 135 degrees; and
determine whether a difference between an absolute value of the first x-component value and an absolute value of the first y-component value satisfies a threshold,
wherein the indication of the result includes an indication of a positive result of performing the safety check when difference of the absolute value of the first x-component value and the absolute value of the first y-component value satisfies the threshold; and
wherein the safety path, to determine the threshold, is configured to:
divide the absolute value of the first x-component value by a value;
divide the absolute value of the first y-component value by the value; or
divide a sum of the absolute value of the first x-component value and the absolute value of the first y-component value by a multiple of the value.

18. A sensor system comprising:
a first set of angle sensing elements configured to determine a first x-component value and a first y-component value, wherein the first set of angle sensing elements are associated with a first measurement range;
a second set of angle sensing elements configured to determine a second x-component value and a second y-component value from a second set of angle sensing elements, wherein the second set of angle sensing elements are associated with a second measurement range that is different from the first measurement range;
a safety check component configured to:
segment, based on an intersection of an x-component signal and a y-component signal associated with the first set of angle sensing elements, the first measurement range into a plurality of first segments;
segment, based on an intersection of an x-component signal and a y-component signal associated with the second set of angle sensing elements, the second measurement range into a plurality of second segments;
determine a first segment, of the plurality of first segments, corresponding to a first range of angles associated with a target object based on a relationship between a magnitude of the first x-component value and a magnitude of the first y-component value;
determine a second segment, of the plurality of second segments, corresponding to a second range of angles associated with the target object based on a relationship between a magnitude of the second x-component value and a magnitude of the second y-component value; and
determine whether the second range of angles is a subset of the first range of angles; and
an output component to provide, to a controller, an indication of a result of a safety check based on whether the second range of angles is a subset of the first range of angles,
wherein the indication of the result of the safety check indicates whether a failure, an error, or a deactivation is associated with one or more of a first angle measurement path associated with the first set of angle sensing elements or a second angle measurement path associated with the second set of angle sensing elements, and
wherein the controller performs one or more operations associated with controlling one or more of an electrical system or an electrical subsystem based on the indication of the result of the safety check.

19. The sensor system of claim 18, wherein the safety check component, to determine the first range of angles, is configured to:
determine that the first range of angles is a range of angles from zero degrees to forty-five degrees when the first x-component value is greater than the first y-component value and the first y-component value is greater than zero;
determine that the first range of angles is a range of angles from forty-five degrees to ninety degrees when the first y-component value is greater than the first x-component value and the first x-component value is greater than zero;
determine that the first range of angles is a range of angles from ninety degrees to 135 degrees when the first y-component value is greater than a negative of the first x-component value and the negative of the first x-component value is greater than zero;
determine that the first range of angles is a range of angles from 135 degrees to 180 degrees when the negative of the first x-component value is greater than the first y-component value and the first y-component value is greater than zero;
determine that the first range of angles is a range of angles from 180 degrees to 225 degrees when the first y-component value is less than zero and the first x-component value is less than the first y-component value;
determine that the first range of angles is a range of angles from 225 degrees to 270 degrees when the first x-component value is less than zero and the first y-component value is less than the first x-component value;
determine that the first range of angles is a range of angles from 270 degrees to 315 degrees when the negative of the first y-component value is greater than the first x-component value and the first x-component value is greater than zero; and
determine that the first range of angles is a range of angles from 315 degrees to 360 degrees when the first x-component value is greater than the negative of the first y-component value and the negative of the first y-component value is greater than zero; and
wherein the safety check component, to determine the second range of angles, is configured to:
determine that the second range of angles is a range of angles from zero degrees to 22.5 degrees when the second x-component value is greater than the second y-component value and the second y-component value is greater than zero;
determine that the second range of angles is a range of angles from 22.5 degrees to forty-five degrees when the second y-component value is greater than the second x-component value and the second x-component value is greater than zero;
determine that the second range of angles is a range of angles from forty-five degrees to 67.5 degrees when the second y-component value is greater than a negative of the second x-component value and the negative of the second x-component value is greater than zero;

determine that the second range of angles is a range of angles from 67.5 degrees to ninety degrees when the negative of the second x-component value is greater than the second y-component value and the second y-component value is greater than zero;

determine that the second range of angles is a range of angles from ninety degrees to 112.5 degrees when the second y-component value is less than zero and the second x-component value is less than the second y-component value;

determine that the second range of angles is a range of angles from 112.5 degrees to 135 degrees when the second x-component value is less than zero and the second y-component value is less than the second x-component value;

determine that the second range of angles is a range of angles from 135 degrees to 157.5 degrees when the negative of the second y-component value is greater than the second x-component value and the second x-component value is greater than zero; and determine that the second range of angles is a range of angles from 157.5 degrees to 180 degrees when the second x-component value is greater than the negative of the second y-component value and the negative of the second y-component value is greater than zero.

20. The sensor system of claim 18, wherein the safety check component is further configured to:

determine that a largest angle included in the first range of angles is equal to a smallest angle included in the second range of angles or determine that a smallest angle included in the first range of angles is equal to a largest angle included in the second range of angles, wherein the indication of the result includes an indication of a positive result of performing the safety check based on the largest angle included in the first range of angles being equal to the smallest angle included in the second range of angles or based on the smallest angle included in the first range of angles being equal to the largest angle included in the second range of angles.

\* \* \* \* \*